United States Patent
Dajani et al.

(10) Patent No.: US 8,462,426 B1
(45) Date of Patent: *Jun. 11, 2013

(54) SCALABLE MONOLITHIC SINGLE FREQUENCY FIBER AMPLIFIER

(75) Inventors: Iyad A. Dajani, Albuquerque, NM (US); Clint M. Zeringue, Albuquerque, NM (US)

(73) Assignee: The United States of America as Represented by the Secretary of the Air Force, Washington, DC (US)

( * ) Notice: Subject to any disclaimer, the term of this patent is extended or adjusted under 35 U.S.C. 154(b) by 647 days.

This patent is subject to a terminal disclaimer.

(21) Appl. No.: 12/630,217

(22) Filed: Dec. 3, 2009

(51) Int. Cl.
*H01S 3/00* (2006.01)

(52) U.S. Cl.
USPC ............................................. 359/334; 372/3

(58) Field of Classification Search
USPC .................................. 372/3, 6; 359/334, 333
See application file for complete search history.

(56) References Cited

U.S. PATENT DOCUMENTS

| | | | |
|---|---|---|---|
| 5,851,259 | A | 12/1998 | Clayton |
| 6,542,683 | B1 | 4/2003 | Evans |
| 7,082,243 | B2 | 7/2006 | Bickham |
| 7,764,720 | B1 * | 7/2010 | Bronder et al. ................... 372/6 |

OTHER PUBLICATIONS

Imai et al, "Dependence of Stimulated Brillouin Scattering on Temperature Distribution in Polarization-Maintaining Fibers," IEEE Photonics Tech. Let., vol. 5, No. 11, Nov. 1.

Jeong et al, "Power scaling of single-frequency ytterbium-doped fiber master-oscillator power- . . . ," IEEE J. Selected Topics in Quantum Elect., vol. 13, No. 3, May/Jun. 2007.

Ming-Jun et al, "Al/Ge co-doped large mode area fiber with high SBS threshold," Opt. Express 15, 8290-8299, Jun. 25, 2007.

Wessels et al, Novel suppression scheme for Brillouin scattering, Optics Express 12, No. 19, pp. 4443-4448, Sep. 20, 2004.

Dajani et al., "Investigation of nonlinear effects . . . " IEEE Journal of Selected Topics in Quantum Electronics 15, No. 2, pp. 406-414, Mar./Apr. 2009.

* cited by examiner

*Primary Examiner* — Mark Hellner
(74) *Attorney, Agent, or Firm* — James M. Skorich; Kenneth E. Callahan

(57) ABSTRACT

A method to increase the output power of monolithic narrow-linewidth Yb-doped fiber amplifiers by suppressing simulated Brillouin scattering. The fiber amplifier employs a co-propagating geometry and is seeded with broad- (source 2) and narrow- (source 1) linewidth signals that are sufficiently different in wavelengths to allow for efficient gain competition and favorable temperature profile at the output end of fiber. The broadband seed signal possesses the higher emission and absorption cross sections. If source 2 is also given sufficiently greater input power than source 1, it will be amplified to its maximum value as the seed signals reach the middle portion of the gain fiber. Beyond that portion, the signal having the lower emission and absorption cross sections (signal 1) will continue to experience gain by power transfer from both signal 2 and the pump light, attaining a power output well beyond what the maximum output would have been had the amplifier been illuminated with a single frequency beam. Furthermore, if the two signals are carefully selected such that appreciable quantum defect heating occurs during the power transfer, a steep thermal gradient develops leading to even further increase in output power.

20 Claims, 4 Drawing Sheets

Absorption Cross-section vs. Wavelength
Yb-doped Silica Fiber

SCALABLE MONOLITHIC SINGLE FREQUENCY FIBER AMPLIFIER

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to optical fibers and in particular to narrow linewidth (single frequency) high-power continuous wave (CW) or quasi-continuous wave fiber lasers and amplifiers. This invention is related to co-pending patent application Ser. No. 12/198,308 filed Aug. 25, 2008.

Stimulated Brillouin scattering (SBS) is a limiting factor in the evolution of rare-earth doped fiber lasers and amplifiers towards higher power. This phenomenon is a result of a third-order nonlinear process that causes the scattering of laser light by a travelling hypersonic acoustic grating. The latter is initiated from thermal noise. From a quantum physics viewpoint, a photon is scattered by a phonon leading to a frequency-shifted photon. Therefore, as a by-product, Doppler-shifted scattered light known as Stokes light is generated. The interaction of the Stokes light with the laser light induces electrostriction in the medium leading to further amplification of both acoustic and Stokes waves. In an optical fiber, momentum conservation requires the Stokes light to propagate in the opposite direction as the laser light. It is well-known in the art that once a certain amount of optical power is coupled into or is generated in the fiber, significant back-scattered Stokes light is produced causing the performance of the fiber to degrade.

This deleterious SBS process is characterized by a gain spectrum that determines the acoustic response of the medium to the pump frequency. Measurements in silica fibers have established a Brillouin shift of approximately 16 GHz and a linewidth of approximately 40 MHz at a signal wavelength of 1-1.1 µm. The effective SBS gain can be diminished through the use of a broad linewidth seed laser. However, several important applications, including coherent beam combination for directed energy purposes, nonlinear frequency conversion in resonant cavities or in single pass configurations, gravitational wave detection, and inter-satellite communications, require the use of high power narrow linewidth optical fiber amplifiers and lasers. Therefore, there is a need for techniques that mitigate the SBS process.

The SBS threshold can be increased by decreasing the effective length of the fiber, increasing the mode field diameter (MFD), or somehow manipulating the Brillouin gain. The increase in the SBS threshold through the decrease of length is limited by either requirements for amplifier efficiency or rare-earth elements solubility in silica. Much work has been done to increase the effective area of the fiber through the use of large mode area (LMA) fibers. While conventional LMA fiber designs have been successful in delivering single mode power outputs exceeding 100 watts, there is general agreement that new approaches are required for further enhancement of power.

A variety of experimental efforts have been attempted or proposed to reduce the SBS threshold through the manipulation of the SBS gain. In U.S. Pat. No. 5,851,259 by Clayton et al., the SBS threshold is reduced by introducing a modulation in the tension applied to the fiber during the draw process. This idea was expanded on in U.S. Pat. No. 6,542,683 by Evans et al. as a permanent, non-uniform stress is imparted to the fiber core through non-uniform thermal expansion and viscosity profiles. The latter inventor shows that a simple modulation of tension during the draw process leads to a marginal increase in the SBS threshold. The technique is limited by the fact that a change in the draw tension leads to a change in the fiber diameter. The latter inventor also did not envision a fiber which could be manufactured with polarization maintaining properties.

An attractive technique used in SBS mitigation is to induce a shift in the Brillouin frequency by introducing a thermal gradient in the fiber. The frequency shift was measured by Imai et al. to be approximately 2 MHz per degree Kelvin as reported in a 1993 paper in IEEE Photon. Technol. Lett. 16, pp. 133-1337. Along these lines, in 2007 Jeong et al. reported in IEEE J. of Selected Topics in Quantum Electron., pp. 546-551, that SBS gain broadening along the longitudinal direction of the fiber due to quantum-defect heating increased the SBS threshold sufficiently enough that signals with linewidths below 1 MHz and powers approaching 500 W were obtained. Fundamentally, quantum defect heating is a manifestation of the energy difference between a pump photon and a signal photon. One can also attempt to tailor the temperature variation in the transverse direction. However, it does not appear based on theoretical analysis that this would yield any appreciable SBS suppression.

Alternatively, transverse tailoring of the acoustic properties of fibers was suggested by Bickham et al. in U.S. Pat. No. 7,082,243 and was reported to be successful in increasing the SBS threshold by Chen et al. in Opt. Express 15, 8290-8299, 2007. But so far, attempts to fully utilize a transverse acoustic gradient in conjunction with a longitudinal thermal gradient have not been fruitful. Furthermore, it is well-known to those practicing the art that, in itself, the full benefit of a quantum defect induced thermal gradient is only realized in what is referred to as a counter-pump configuration. In such a configuration, the signal light propagates in the opposite direction to the pump light. While such a configuration is beneficial in suppressing SBS, it is not well-suited for monolithic all fiber configurations due to the exposure of pump combiners to the signal light. Consequently, robust deployment of counter-pumped fibers in rugged environments is problematic.

Another important issue for the full utilization of thermal gradients is the operating temperature of the acrylate polymer in the outer cladding region or in the coating region of the fiber. Operating temperatures are typically under 200° C. Based on theoretical analysis, it is possible then to be thermally limited. In other words, the polymer material will be damaged due to the heat generated in the core prior to the SBS threshold being reached. Therefore, it is of considerable interest to explore ideas to keep the temperature from exceeding maximum operating temperature while maintaining an effective thermal gradient for SBS suppression purposes.

In 2004, Wessels et al. reported in Optics Express 12, pp. 4443-4448 on a 72 m-long fiber amplifier pumped with two seed lasers. The two seed signals were separated by twice the SBS shift. The Stokes generated light from one laser signal coupled into the second laser light, allowing the first laser signal to grow to twice the power level of a single seed amplifier. One significant drawback of this technique is the requirement that the two seed signals have to be precisely tuned. Another significant drawback is that at such a small frequency separation, a parasitic process known as four-wave mixing (FWM) is prominent, leading to the generation of several frequency sidebands. This broadening of the optical power spectrum precludes the implementation of this method in fiber laser applications that require well-defined spectra such as coherent beam combining. Alternatively, another technique was proposed in 2009 by Dajani et al. in IEEE Journal of Selected Topics in Quantum Electronics 15, pp. 406-414 whereby a broad- and narrow-linewidth seed laser signals are employed. The two laser signals are sufficiently separated in wavelengths to suppress FWM while allowing for efficient gain competition resulting, at the output end of the fiber, in the narrow linewidth signal dominating the signal output power. While this technique can result in tripling the output power of the narrow linewidth signal, the authors address neither the utility of developing a thermal gradient in the fiber in conjunction with the aforementioned technique nor provide a recipe for achieving a large thermal gradient.

While some of the foregoing patents and applications may describe techniques that can lead to improvement in the power output of narrow linewidth amplifiers, each can have limitations. Accordingly, there remains a need in the art for new methods that address prior deficiencies.

SUMMARY OF THE INVENTION

The present invention for mitigating SBS effects is a novel technique that takes advantage of the emission and absorption properties of ytterbium (Yb)-doped fibers or any fibers doped with other rare-earth elements with similar spectroscopic properties. The technique employs a co-propagating pump configuration where broad- and narrow-linewidth signals are coupled into a fiber and propagate in the same direction as the pump. The signals are selected such that the broadband signal has a shorter wavelength and greater emission and absorption cross sections than the narrow-linewidth signal. Furthermore, the input power of the former is significantly greater than the latter. Initially, both signals grow with distance along the fiber. However, at a certain point along the fiber, the broad-band signal will begin to rapidly transfer its power to the narrow-linewidth signal. Consequently, the effective length of the fiber is shortened leading to an increase in the SBS threshold. Appreciable further enhancement is achieved when a U- or V-shaped temperature profile, or a point of inflection in the temperature profile, is induced in a significant portion of the fiber due to quantum defect heating. Alternatively, in some cases, a large portion of the fiber can be kept at constant temperature through external control of the heat flow, while allowing for a steep negative or positive temperature gradient to be developed at the output end of the fiber due to quantum defect heating. This can potentially lead to even better SBS suppression. Both of these scenarios can be accomplished by careful selection of the signal wavelengths.

DESCRIPTION OF THE PREFERRED EMBODIMENT

Figure 1:
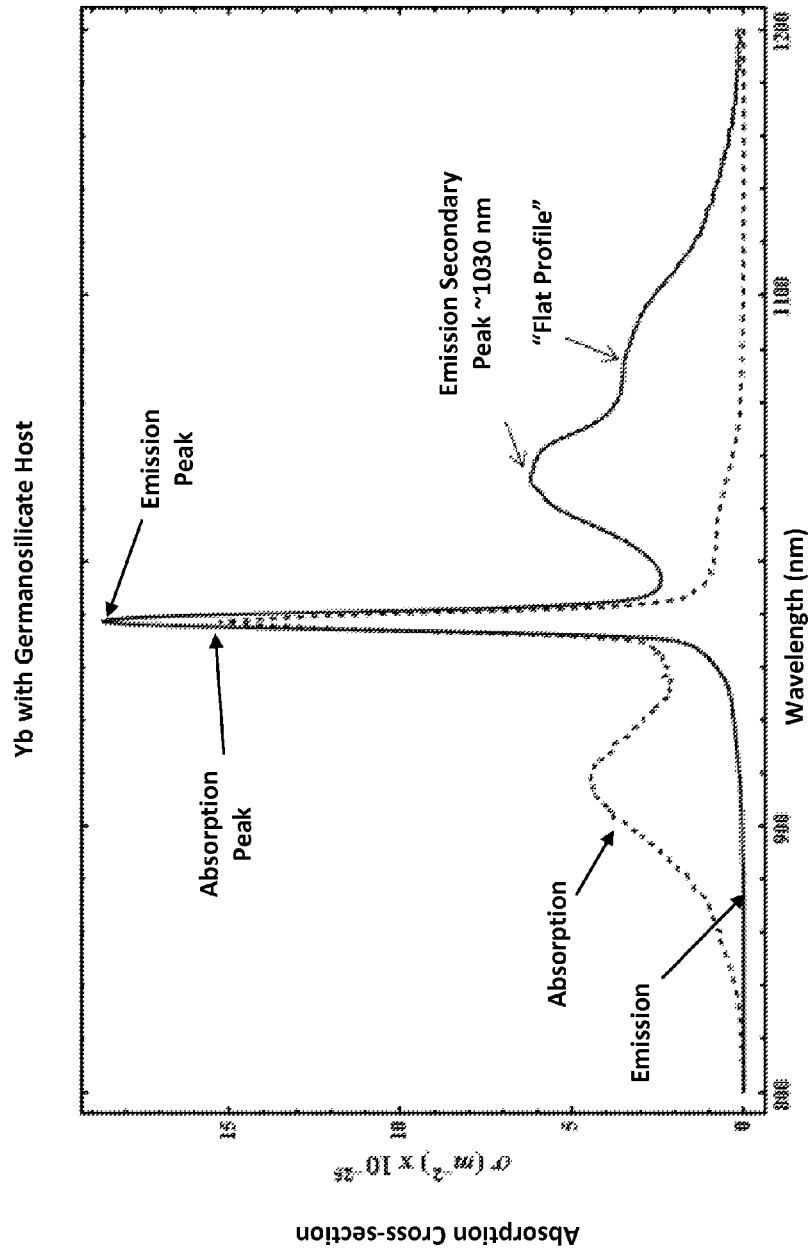
FIG. 1 is a plot of the absorption and emission cross sections for a Yb-doped fiber

The present invention is a method of suppressing the stimulated Brillouin scattering (SBS) effect in order to allow for the design of high power narrow linewidth (single frequency) lasers and amplifiers. The invention is applicable to various waveguide structures comprised of core and cladding regions in which most of the light power is contained in the core. The invention will also work in conjunction with other SBS suppressing schemes.

As an overview, a Yb-doped double clad fiber amplifier consists of a silica core doped with the rare-earth element ytterbium (Yb), an inner cladding region, and outer cladding region. The purpose of the double clad is to provide guiding for the pump light. The purpose of ytterbium is to provide laser gain due to the pump absorption in the core. Laser gain is achieved when a sufficient number of electrons are made to occupy the upper energy lasing level of a Yb ion. In addition to the pump light, a laser beam called the "signal" (or "seed") is coupled into the core. As this signal travels along the length of the fiber, it encounters laser gain due to the population inversion and is thus amplified. As a result, power is typically transferred from the low brightness multi-mode pump light and into the high brightness single mode light making the amplifier suitable for a variety of applications. As discussed above, SBS is a major obstacle towards this amplification process and will thus impose an upper limit (threshold) on the amount of signal light that can be generated in a given amplifier.

The present invention makes use of the simultaneous illumination of the fiber amplifier by two seed signals possessing different wavelengths with a wavelength separation of approximately 20 nm or greater. Furthermore, one of the signals (source 2) possesses a broad linewidth, while the other signal (source 1) possesses a narrow-linewidth. In this case "broad-linewidth" (or "broadband") indicates that the spectral width is much greater than the SBS gain spectrum. Source 2 should have a linewidth that is greater than 7 times the Brillouin gain spectral width for near maximum benefit. Source 2, however, could function from greater than 3 to at least 20 times the Brillouin gain spectral width. Those skilled in the art will recognize that this broadband signal does not generate much SBS if any. The "narrow-linewidth", which is often referred in the art as "single frequency", indicates the spectral width is on the order of the Brillouin gain spectral width or less. The wavelengths and input powers of the two seed signals are chosen such that the emission and absorption cross sections and input power of signal 2 is greater than that of signal 1. A reasonable input power range ratio would be for source 2 to have 10 times or greater input power compared to source 1. Power ratios below 10 to 1 but greater than 3 to 1 can still work but with reduced benefit. It is best not to put an upper limit on this ratio since the optimal value is determined by the specifics of the amplifier and can be different for different configurations. Generally, the upper limit on the power ratio would be greater than 20 to 1.

In a co-pumped configuration and with no consideration of the thermal gradient, both signals will initially grow along the length of the fiber until a point where signal 2 will start transferring its power to signal 1. Due to the confinement of signal 2 to the core, this power transfer is highly efficient and comparable to the power transfer of the pump light (which propagates in the core and inner cladding) to the signals. As a result, the output power will be predominantly comprised of signal 1. The favorable spatial profile of signal 1 in the fiber as a result of the gain competition leads to an increase in the SBS threshold and consequently amplifier performance. This effect can be enhanced significantly if a steep thermal gradient is induced at the output end of the fiber.

For a co-pumped configuration and single seed signal, it is well-known that a steep negative thermal gradient due to quantum defect heating develops at the input end of the fiber. Meanwhile, little variation in temperature is induced at the output end where the signal is highest. Consequently, little SBS suppression is obtained due to the temperature profile. With two signals coupled into the fiber as described above, careful selection of the wavelengths is required in order to forgo a similar temperature profile as the single seed case. In order to obtain a steep thermal gradient at the output end of the fiber, a U or V-shaped temperature profile, or a point of inflection leading to a steep thermal gradient, needs to be induced in a significant portion of the fiber. This can be accomplished if sufficient quantum defect heating is obtained during the process of power transfer from signal 2 to signal 1. Therefore, the wavelengths of the two signals need to be separated as much as possible while maintaining efficient laser gain along the length of the fiber.

To illustrate this technique, we refer to FIG. 1 which depicts the spectroscopic properties of Yb-doped silica fibers. As shown, the peak absorption cross section is located near 976 nm. Due to this, diode lasers operating at or near this wavelength are coupled into the cladding region as pump light for fiber lasers and amplifiers and with sufficient power to induce population inversion in the core. At the longer wavelength side of the figure (right side of primary peaks of the absorption and emission cross sections), a secondary peak for the emission cross section appears near 1030 nm. However, note that no secondary peak to the right of the primary appears for the absorption cross section. Instead, the absorption cross section continues to decrease with increasing wavelength. At approximately 1100 nm, the emission cross section drops significantly enough and a parasitic lasing process known as amplified spontaneous emission (ASE) becomes problematic. As a result, it is rather difficult to construct Yb-doped fiber lasers and amplifiers beyond 1100 nm. Therefore, the wavelength region 1030-1090 nm is the most suitable for implementation in an efficient fiber amplifier. It should be pointed out here that, for two-signal seeding of the amplifier, some suppression of ASE is expected which can make this wavelength range somewhat broader.

For the broadband signal 2 (signal 2) utilized in this invention, the most suitable wavelength range is 1030 nm-1045 nm as sufficient absorption can occur once this signal reaches its peak value. Those practicing the art will recognize that this absorption process is crucial for transferring the power from signal 2 to signal 1. For the latter, the most suitable range is 1060-1080 nm as laser gain, which depends on both the emission and absorption cross sections, is maximized. Note from FIG. 1 that this range is characterized by an almost "flat" profile of the cross sections. In order to get a U-shaped or V-shaped profile in a significant portion of the fiber, it is crucial to obtain high quantum defect heating during the power transfer while ensuring that the two signals, at the very least, lie within the wavelength ranges prescribed above. In other words, the wavelengths required to optimize the quantum defect heating are a subset of these ranges. Since the photon energy is inversely proportional to the wavelength and the quantum defect heating is a manifestation of the difference in energy among the photons of the two signals, those practicing the art will now recognize for maximum benefit the need to operate signal 2 at the lower end of its appropriate wavelength range, and signal 1 near the upper end of its appropriate wavelength range. It is important to point out here that the total power transfer among signal 1, signal 2, and the pump typically dictates an even more precipitous drop in temperature following the U- or V-shaped profile. Since this process occurs near the output end of the fiber where signal 1 is highest, significant suppression of SBS is obtained. Alternatively, in some cases, one can forgo the U- or V-shaped profiles by external control of the temperature of the fiber up to those points, and then allowing a steep drop or rise in temperature to develop at the output end of the fiber.

Figure 2:
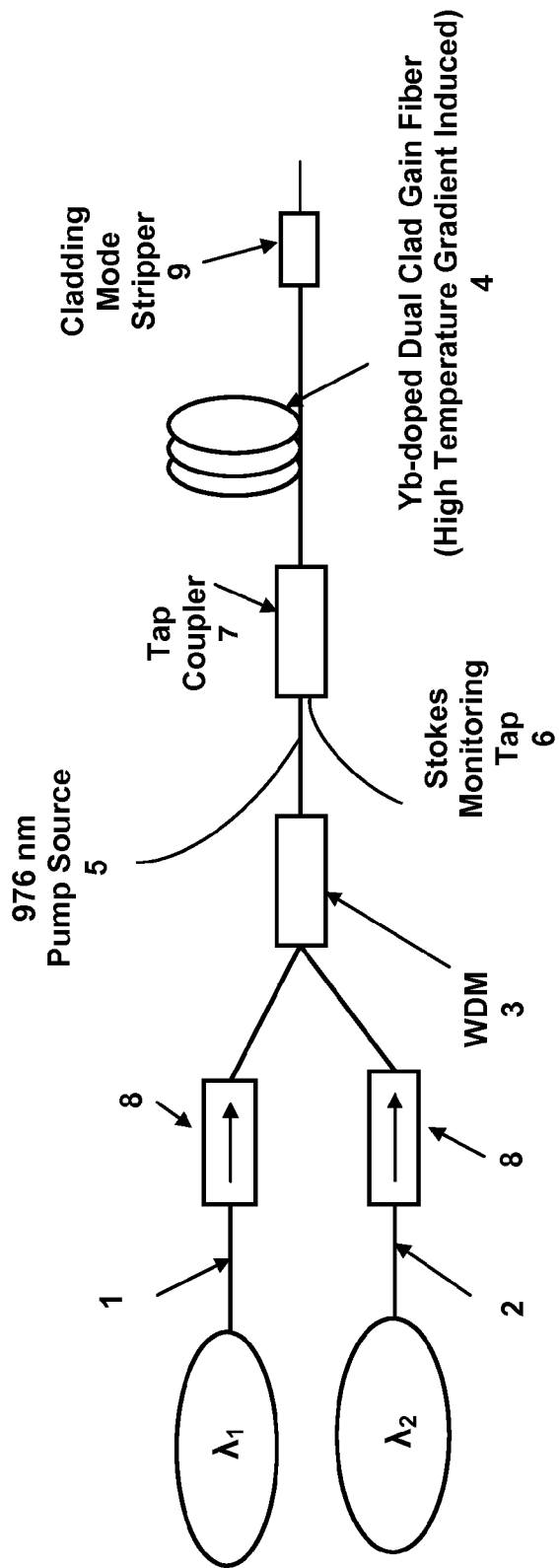
FIG. 2 is a block diagram of the experimental set-up

FIG. 2 illustrates one possible experimental implementation of the invention. Two beams of seed light 1, 2 oscillating at different wavelengths are made available. These beams can be enhanced in power using master oscillator power amplifier (MOPA) systems. The two beams are brought together in a wavelength division multiplexer (WDM) 3 before being coupled into the gain fiber 4 whereby amplification of the light signals occurs. As discussed above, the gain fiber 4 contains a guiding core that is doped with a rare-earth element. In order to cause population inversion, the gain fiber is pumped 5 by an array of diode lasers. A typical pump wavelength for a Yb-doped amplifier, for example, is in the vicinity of 976 nm. The double clad fiber amplifier is spliced onto a cladding mode stripper 9 which will couple out all unused pump light. The backward-travelling Stokes light is monitored using a 1% backward tap coupler 7 spliced into the fiber and imaged with an OSA. To ensure the amplifier operates without allowing any backward scattered light that can damage the seed sources, optical isolators 8 are employed in the set-up. As shown in the figure, a thermal gradient is induced at the output end of the fiber due to the proper choice of wavelengths.

While this technique should prove to be very effective in monolithic systems, it can also be readily employed in systems in which any or all of the optical waves are coupled into the fiber or other parts of the system using free space optics. Regardless of the particular experimental implementation of this invention, there are two parameters which are key components of the design that need to be controlled in order to obtain power enhancement of the single frequency laser beam. These two parameters are the power ratios among the seed signals and the wavelength (or equivalently frequency) separations. Another consideration is to ensure that the temperature of the coating does not exceed the maximum operating temperature.

It is well-known in the art that each laser beam experiences gain or loss due to interaction with the gain medium and that only the narrow-linewidth laser light generates its own Stokes light which travels in the opposite direction. Moreover, due to the shift in the Brillouin resonance frequency as a result of the temperature gradient, the Stokes frequency can be thought of as a collection of frequencies. Starting with Maxwell's equations and using standard derivation procedures used in the field of nonlinear optics, we obtain the following two equations that describe the spatial evolution of the powers of the two signals:

$$\frac{dP_1}{dz} = g_1 P_1 - \sum_i \frac{g_{B1} P_{1S,i} P_1}{A_{\it eff}}, \quad (1)$$

$$\frac{dP_2}{dz} = g_2 P_2 \quad (2)$$

Where $g_1$ and $g_{B1}$ are the laser and Brillouin gain coefficients for the signal wave oscillating at $\omega_1$, respectively, $g_2$ is the laser gain for the signal wave oscillating at $\omega_2$, and where $A_{\it eff}$ is the effective area. The summation sign in the above equation accounts for the frequency spread in the Stokes light due to the thermal gradient. The laser gain coefficients for the two frequencies are given by:

$$g_1 = N_2 \sigma_1^{(e)} - N_1 \sigma_1^{(a)}, \quad (3)$$

$$g_2 = N_2 \sigma_2^{(e)} - N_1 \sigma_2^{(a)}, \quad (4)$$

where $N_1$ and $N_2$ are the population densities of the upper and lower energy levels, respectively, $\sigma_1^{(e)}$ and $\sigma_1^{(a)}$ are the emission and absorption cross sections for $\omega_1$, respectively, and where $\sigma_2^{(e)}$ and $\sigma_2^{(a)}$ are the emission and absorption cross sections for $\omega_2$, respectively. The population densities at steady state can be obtained using standard laser physics treatment of quasi two level systems.

For a co-propagating pump in a double clad configuration, the evolution of the pump power is given by:

$$\frac{dP_p}{dz} = \frac{d_{core}^2}{d_{clad}^2}(N_2 \sigma_p^{(e)} - N_1 \sigma_p^{(a)})P_p \quad (5)$$

Where $d_{core}$ and $d_{clad}$ are the diameters of the core and cladding regions, respectively. The Stokes wave is initiated from noise and travels in the backward direction. It is amplified through both SBS scattering and laser gain. The evolution of the Stokes power is given by:

$$\frac{dP_{1S,i}}{dz} = -g_1 P_{1S,i} - \frac{g_{B1} P_1 P_{1S,i}}{A_{eff}}, \quad (6)$$

In reality, Eq. (6) is comprised of many equations, each describing a particular Stokes frequency. Based on the power balance, the heat generated in the fiber is given by:

$$Q(r \le d_{core}/2, z) = \frac{-4}{\pi d_{core}^2}\left(\frac{dP_p(z)}{dz} + \frac{dP_1(z)}{dz} + \frac{dP_2(z)}{dz}\right) \quad (7)$$

$$Q(r < d_{core}/2, z) = 0 \quad (8)$$

To determine the temperature induced in the fiber, the following equation, which is referred to in the scientific literature as the heat equation, is solved:

$$-k_{th}\frac{1}{r}\frac{\partial}{\partial r}\left(r\frac{\partial T}{\partial r}\right) = Q(z) \quad (9)$$

This equation is subject to the boundary condition given by:

$$k_{th}\frac{\partial T(r = r_{outer})}{\partial r} = h[T_c - T(r = r_{outer})] + e\sigma_{st}[T_c^4 - T^4(r = r_{outer})] \quad (10)$$

Where $k_{th}$ is the thermal conductivity of the coating, $r_{router}$ is the outer radius of fiber, e is the emissivity, and h is the convective cooling condition. This boundary condition accounts for the heat loss at the surface of the fiber due to radiative cooling as well as convective cooling.

Practical fiber amplifiers are typically pumped at frequencies possessing high absorption cross sections. Referring to Equations (3) and (4), the laser gain experienced by the two seed frequencies will be different. For a co-propagating pump configuration, the upper level population density, $N_2$, is relatively high in the proximity of the input end of the fiber and both signals experience gain. If pumping power is high and the input power of signal 2 is significantly larger than that of signal 1, the former is amplified to its maximum value before these signals have propagated to the midpoint of the fiber. This power value is much higher than that of signal 1 at that point of the fiber. Due to significant absorption of the pump light, the population inversion beyond that point is such that signal 2 will become attenuated. Equation (4) indicates that occurs when $\sigma_2^{(e)} N_2 > \sigma_2^{a} N_1$. However, if the absorption cross section of signal 1 is much smaller than that of signal 2, the former will continue to experience laser gain leading to a power transfer from both signal 2 and the pump light and into signal 1. Even though the absorption cross section for signal 2 is much smaller than the pump, the power transfer from signal 2 to signal 1 is very rapid due to the confinement of signal 2 to the core. The reduction in the Stokes light is due to the suppressed amplification of signal 1 in a significant portion of the fiber as can be inferred from the equations above. From Eq. 7, when the gradient of power for signal (2) goes negative, additional heat is being deposited in the fiber due to the power transfer of the signals. For a large separation of wavelength between the two signals, this thermal gradient becomes steep and a U- or V-shaped temperature profile develops. This leads to a remarkable enhancement in the SBS threshold; well beyond that obtained if no thermal gradient was developed.

The following examples will make those practicing the art appreciate the design parameters needed to implement this invention. The design was run using a fully developed simulation system that extends beyond the simplified equations discussed above and accounts for the spatial distribution of the Brillouin noise as well as effects due to the transverse profiles of the signals within the fiber.

EXAMPLES

A double clad fiber with a core diameter of 25 μm and an inner cladding diameter of 400 μm. The outer cladding and fiber coating extends to 550 μm and is composed of a polymer material. The maximum operating temperature of the polymer is 150° C. Three cases are compared: I) a co-pumped single seed single frequency amplifier operating at 1080 nm; II) a counter-pumped single seed single frequency amplifier operating at 1080 nm; and III) a two signal co-pumped amplifier with the broadband signal at 1030 nm and the single frequency signal at 1080 nm. All fibers were 6.5 m in length and each of the cases was optimized to operate at the maximum SBS threshold by controlling the convective cooling coefficient, h, described above.

Figure 3:
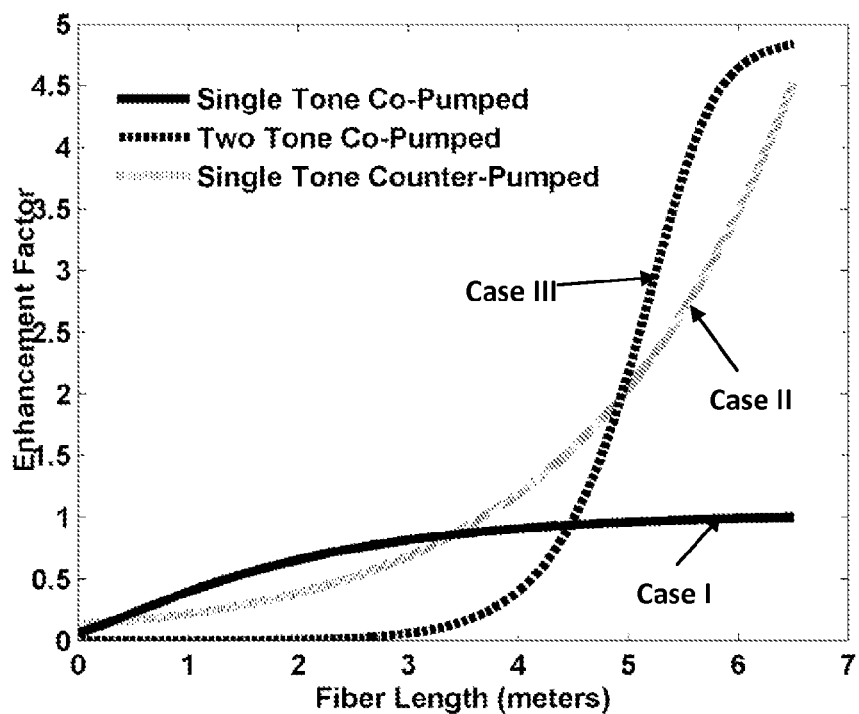
FIG. 3 is a plot of the spatial evolution of the signal powers for three cases: I) a co-pumped single seed single frequency amplifier operating at 1080 nm. II) a counter-pumped single seed single frequency amplifier operating at 1080 nm III) a two signal co-pumped amplifier with the broadband signal at 1030 nm and the single frequency signal at 1080 nm
Figure 4:
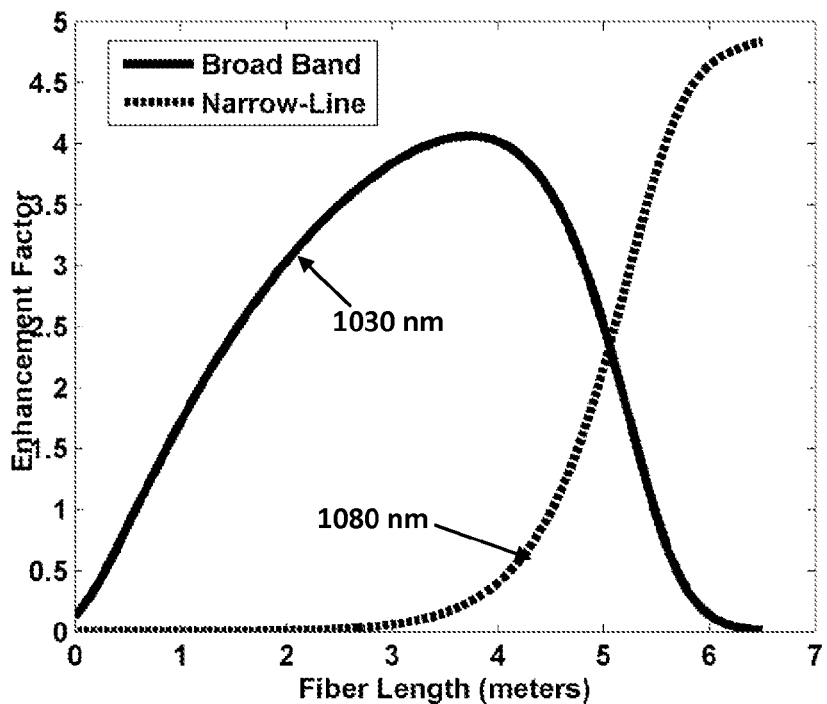
FIG. 4 is a plot of the evolution of the 1030 nm and 1080 nm light pertaining to case III

FIG. 3 shows plots of the evolution of the single frequency (narrow-linewidth) signals (1080 nm) along the length of the fiber. The output powers are normalized such that the output power from case I is equal to 1. Note that case II provided approximately 4.5 times the output power, while case III provided approximately 5 times the output power. We again point out that case III, which an example of this invention, is much more suitable for implementation in a monolithic system. FIG. 4) is a plot of the evolution of both 1030 nm light and 1080 nm light for case III along the length of the fiber; indicating the power transfer between the two signals. Note that signal (2) rises slowly initially and then has an almost exponential increase in power at the output end of the fiber. This is crucial for SBS suppression.

Figure 5:
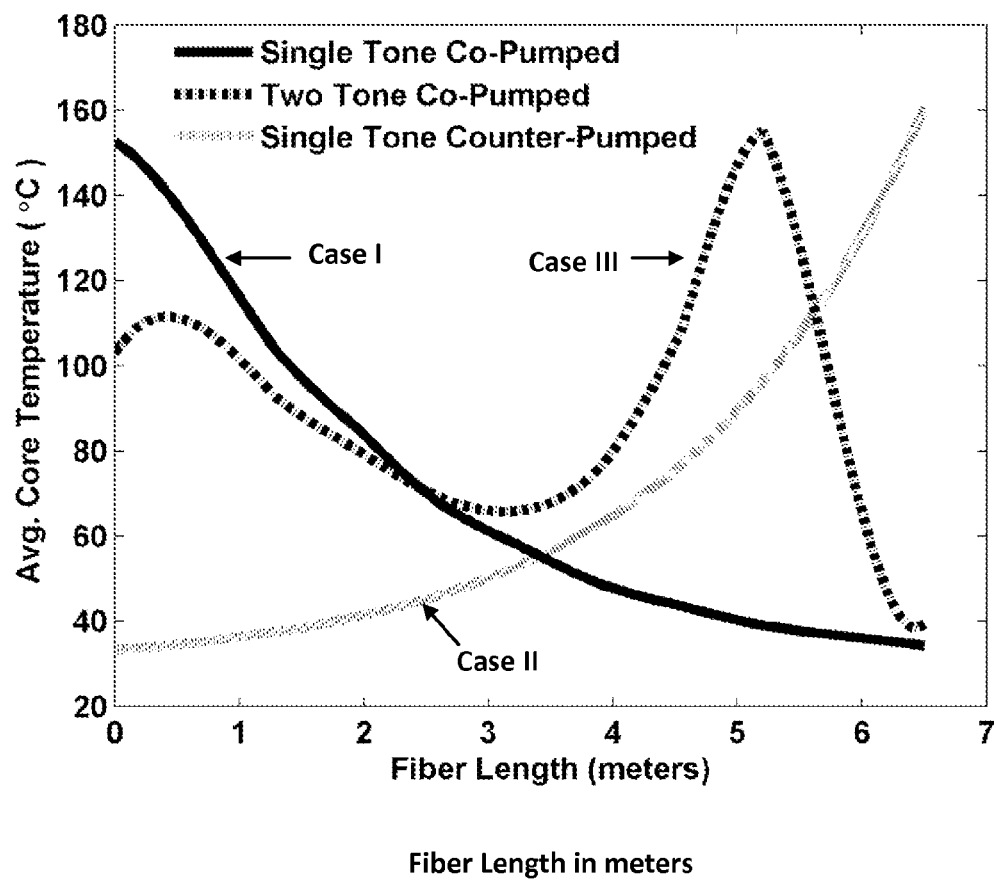
FIG. 5 is a plot of the temperature profiles for the three cases of FIG. 3.

FIG. 5) shows plots of the core temperature profiles for the three cases. Note the U-shaped temperature profile in part of the fiber for case III. This is not characteristic of the other two cases. Also, note the steep drop in temperature following the U-shape. This leads to significant suppression in SBS. We point out that the maximum temperature is slightly higher for case II than case III even though the latter has higher output power. Furthermore, the optimal convective cooling coefficient needed to keep the coating under 150° C. was much higher for case II than case III as the heat distribution is much more evenly distributed for the latter. Consequently, this invention allows for better thermal management of high power fiber amplifiers.

Alternatively, for case III, one can forgo the U-shaped temperature profile by placing about 5 meters of fiber on a cold metal plate to keep the temperature constant in that portion of the fiber. The final 1.5 meters is allowed to have a steep temperature gradient developed through quantum defect heating. For this scenario a comparable signal output (and perhaps even higher) is obtained.

A master oscillator power amplifier system may also be made up of a plurality of high-powered narrow-linewidth laser amplifiers connected in series, wherein either or both seed beams for the final stage fiber are amplified to the required power levels in stages.

The invention claimed is:

1. A method of producing a high-powered narrow-linewidth laser output by reducing the stimulated Brillouin scattering effect, comprised of:
   providing a double clad gain fiber having an outer and an inner cladding, a Brillouin gain spectral width, and a Yb-doped core such that most of the laser ht is contained in the core, said gain fiber having an input end, an output end, and a middle section, and the core of said gain fiber being acoustically homogeneous;
   pumping said gain fiber at the input end by a pump source to produce population inversion;
   providing a first seed light source and a second seed light source, with each having a respective wavelength;
   said first seed light source having a linewidth on the order of the Brillouin gain spectral width or less, an input power level, and a wavelength separation of approximately 20 nm or greater from the wavelength of said second seed light source;
   said second seed light source having higher emission and absorption cross-sections than said first seed light source, an input power level of at least 3 times the input power level of said first seed light source, and a spectral width of at least 3 times the Brillouin gain spectral width at the wavelength of said second seed light source;
   combining said first and second seed light sources with a wavelength division multiplexer;
   coupling out unused pump light;
   optically isolating said first and second seed light sources to prevent damage from backward scattered light;
   optically combining said first and second seed light sources prior to coupling them into the input end of said gain fiber; and
   amplifying said first seed light source to provide a high-powered narrow-linewidth laser output of at least 100 W.

2. The method of claim 1, wherein the coupling out of unused pump light is done by splicing a cladding mode stripper at the output end of said gain fiber.

3. The method of claim 2, wherein the input power level of said second seed light source is approximately 10 times the input power level of said first seed light source.

4. The method of claim 1, wherein the wavelength of said second seed light source is within a wavelength range of 1030 to 1045 nm and the wavelength of said first seed light source is within a wavelength range of 1060 to 1080 nm.

5. The method of claim 4, wherein said fiber has a temperature profile, and said temperature profile is controlled by external temperature controls.

6. The method of claim 4, further comprising a composite temperature profile for said input end and said middle section and an output end temperature profile for said output end;
   controlling said composite temperature profile by external temperature controls; and
   having said output end temperature profile being dictated by quantum defect heating.

7. A high-powered narrow-linewidth laser amplifier comprised of:
   a double clad gain fiber having an outer and an inner cladding, a Brillouin gain spectral width, a Yb-doped core such that most of the laser light is contained in the core, an input end, an output end and a middle section;
   a pump source;
   a first seed light source and a second seed light source, with each having a respective wavelength;
   said first seed light source having a linewidth on the order of the Brillouin gain spectral width or less, an input power level, and a wavelength separation of approximately 20 nm or greater from said second seed light source wavelength;
   said second seed light source having higher emission and absorption cross-sections than said first seed light source, an input power level range of at least 3 times the input power level of said first seed light source, and a spectral width of at least 3 times the Brillouin gain spectral width at said second seed light source wavelength;
   a wavelength division multiplexer to combine said first and second seed light sources;
   means for coupling out unused pump light; and
   optical isolators to protect said first and second seed light sources from backscattered light, whereby
   the stimulated Brillouin scattering effect is suppressed and power from said second seed light source is transferred to said first seed light source resulting in a high-powered narrow-linewidth laser output.

8. The laser amplifier of claim 7, wherein the wavelength of said second seed light source is within a second wavelength range of 1030 to 1045 nm and the wavelength of said first seed light source is within a first wavelength range of 1060 to 1080 nm.

9. The laser amplifier of claim 8, wherein:
   the second seed light source wavelength is in the lower end of the second wavelength range and the first seed light source wavelength is in the upper end of the first wavelength range, whereby
   a U-shaped or V-shaped temperature profile, or a temperature profile with a point of inflection, is induced in the middle section of said fiber followed by a rapid temperature drop or rise at the output end of said fiber.

10. The laser amplifier of claim 8, wherein said fiber has a temperature profile controlled by external temperature controls.

11. The laser amplifier of claim 8, wherein:
    said input end and said middle section of said fiber have a temperature profile controlled by external temperature controls; and
    the output end of said fiber has a temperature profile dictated by quantum defect heating.

12. The high-powered narrow-linewidth laser amplifier of claim 7 further comprising means for amplifying said first seed light source to provide a high-powered narrow-linewidth laser output of at least 100 W.

13. A master oscillator power amplifier system, comprising a plurality of high-powered narrow-linewidth laser amplifiers connected in series, wherein at least one of said high-powered narrow-linewidth laser amplifiers further comprises:
a double clad gain fiber having a Brillouin gain spectral width, an outer and an inner cladding, a Yb-doped core, an input end, an output end and a middle section;
a pump source coupled into the input end;
a first seed light source and a second seed light source, with each having a respective wavelength;
said first seed light source being coupled into the input end and having a linewidth on the order of the Brillouin gain spectral width or less, an input power level, and a wavelength separation of at least approximately 20 nm from the second seed light source wavelength;
said second seed light source having emission and absorption cross-sections greater than those of said first seed light source, an input power level of at least 3 times the input power level of said first seed light source, and a spectral width of at least 3 times the Brillouin gain spectral width at the second seed light source wavelength;
a wavelength division multiplexer for combining said first and second seed light sources;
means for coupling out unused pump light out of the output end; and
optical isolators for protecting said first and second seed light sources from backscattered light, whereby
a stimulated Brillouin scattering effect is suppressed and power from said second seed light source is transferred to said first seed light source resulting in a high-powered narrow-linewidth laser output.

14. The laser amplifier of claim 13, wherein the second seed light source wavelength lies within a second wavelength range of 1030 to 1045 nm and said first seed light source wavelength lies within a first wavelength range of 1060 to 1080 nm.

15. The laser amplifier of claim 14, wherein:
the second seed light source wavelength lies in the lower end of the second wavelength range and the first seed light source wavelength lies in the upper end of the first wavelength range, whereby
a U-shaped or V-shaped temperature profile, or a temperature profile with a point of inflection, is induced in the middle section of said fiber followed by a rapid temperature drop or rise at the output end of said fiber.

16. The laser amplifier of claim 14, wherein
said fiber has a temperature profile; and further comprising an external temperature control for controlling said temperature profile.

17. The laser amplifier of claim 14, wherein:
the input end and middle section have a composite temperature profile controlled by an external temperature control; and
the output end has a temperature profile dictated by quantum defect heating.

18. The method of claim 1, wherein the core of said gain fiber has a transversally and longitudinally varying acoustic velocity.

19. The method of claim 1, wherein the core of said gain fiber has a transversally varying acoustic velocity.

20. The method of claim 1, wherein the core of said gain fiber has a longitudinally varying acoustic velocity.

* * * * *